Nov. 23, 1937. J. H. MILLER 2,100,260
THERMOCOUPLE AMMETER
Filed Sept. 11, 1936
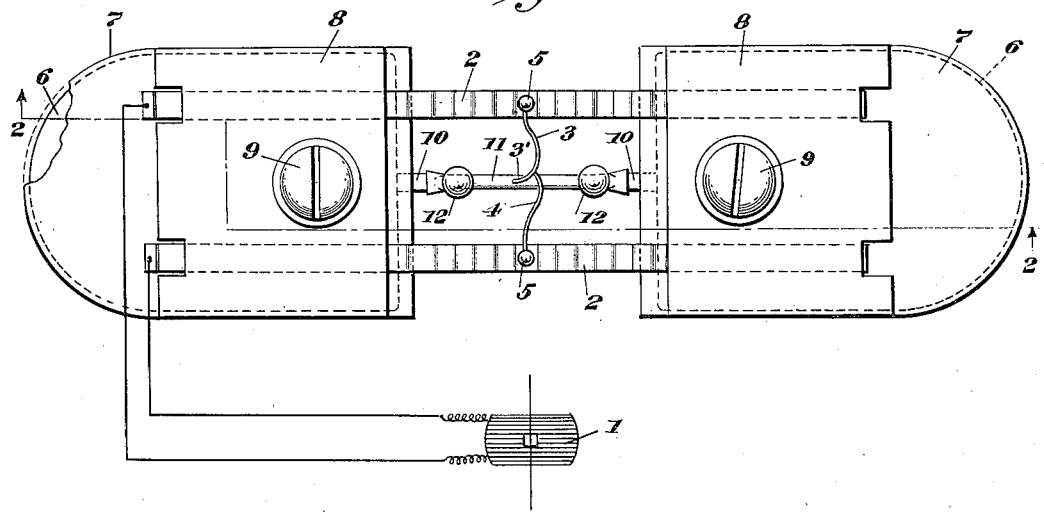
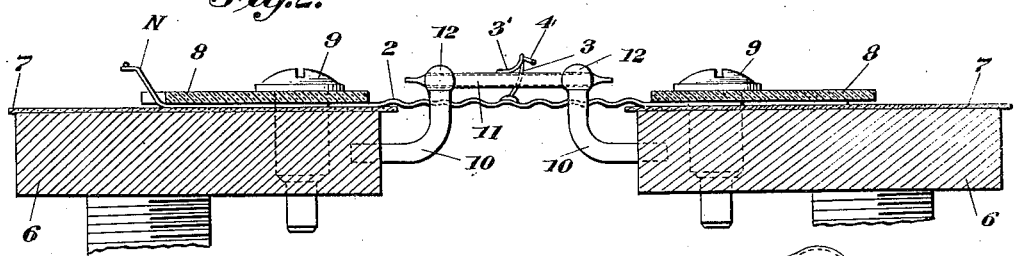
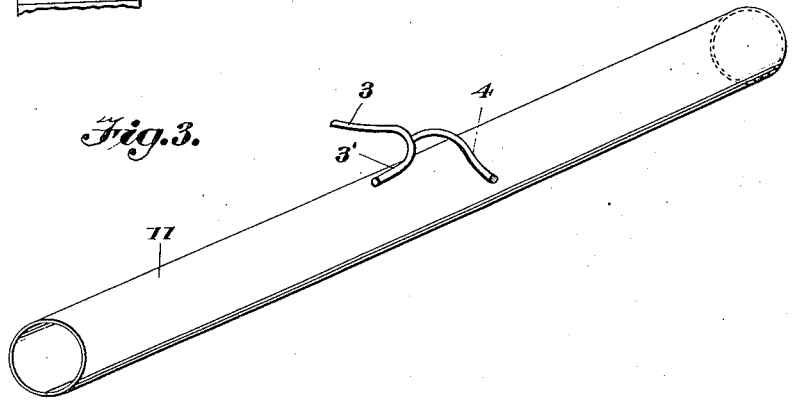
Inventor:
John H. Miller,
By Potter, Pierce & Scheffler
Attorneys.

Patented Nov. 23, 1937

2,100,260

UNITED STATES PATENT OFFICE 2,100,260

THERMOCOUPLE AMMETER

John H. Miller, Short Hills, N. J., assignor to Weston Electrical Instrument Corporation, Newark, N. J., a corporation of New Jersey Application September 11, 1936, Serial No. 100,372

8 Claims. (Cl. 171—95)

This invention relates to thermocouple ammeters, and more particularly to thermocouple ammeters for use at high and ultra-high frequencies.

The method of operation of the thermocouple ammeter is, as is well known, the heating of a resistance wire by the current to be measured, and the measurement of the temperature of the resistance wire by a thermocouple and a millivoltmeter.

The patents to William N. Goodwin, Jr., Nos. 1,407,147 and 1,456,591, describe methods of compensating for thermally-produced errors, and thermocouple ammeters constructed in accordance with the design requirements stated in those patents have been in use in the radio industry for many years. This compensated type of thermocouple ammeter is the most satisfactory instrument for the measurement of high frequency currents but the progressive extension of the radio development work in the field of "ultra-high", frequencies has shown that there is a frequency limit beyond which the indicated current flow is substantially higher than the actual current flow. Errors of the order of up to 100% have been observed when 5-ampere thermocouple ammeters of the prior designs were used at 100 megacycles.

A consideration of the progressive increase in the error with frequency, and of the temperature-measurement method of operation of the thermocouple ammeter indicates that this error is due to skin effect or apparent increase in the resistance of the heater element as the frequency of the heating current is increased. It has been proposed to correct for this error by compensating networks, but such compensation is difficult in view of the low resistance of the heater element, which is, for example, only about 0.04 ohm in a 5-ampere instrument. Furthermore, compensation is usually obtainable only in the region of one frequency, and large errors exist at other frequencies.

Objects of the present invention are to provide thermocouple ammeters, and thermocouples for association with millivoltmeters as current measuring devices, that will indicate current flow in the ultra-high frequency range with high accuracy.

An object is to provide a thermocouple ammeter of novel construction in which the temperature attained by the thermocouple heater element is approximately the same, for a given current flow, at high frequencies and at ultra-high frequencies. More specifically, objects of this invention are to provide thermocouples and thermocouple ammeters in which the heater element is of tubular form and has an effective resistance that is approximately independent of the frequency of the current to be measured.

These and other objects and advantages of the invention will be apparent from the following specification when taken with the accompanying drawing in which:

Fig. 1 is a plan view of a thermocouple ammeter embodying the invention, the millivoltmeter being shown diagrammatically;

Fig. 2 is a side elevation of the thermal converter unit of Fig. 1; and

Fig. 3 is a perspective view, on a greatly enlarged scale, of the heater element and thermocouple junction.

In the drawing, the reference numeral 1 identifies a millivoltmeter that is connected to the compensating strips 2 or cold terminals of a thermocouple consisting of wires 3, 4 of dissimilar metals. The junction of the thermocouple is thermally connected to the center of a heater, as will be described later, and the ends of the thermocouple wires are secured to the centers of the respective compensating strips by solder 5. The ends of the compensating strips are thermally connected to but electrically insulated from relatively massive heater terminals 6 by thin sheets of mica 7, and these parts are held in assembled position by pieces of insulating material 8 that are clamped to the terminals 6 by screws 9. Lugs or inserted heavy wires 10 extend from the opposed surfaces of the terminals 6 and are bent upwardly into proximity to support a short heater element.

The construction so far described will be recognized as a thermocouple ammeter of the compensated type described in the Goodwin patents. According to prior practice, the heater element for a 5-ampere ammeter may have been, for example, a platinum iridium wire of 11 mil diameter (0.011 inch) and 0.2 inch long. The resistance of such a heater element at 100 megacycles is about 2.6 times its low frequency resistance, and the net effect of this resistance increase on the instrument scale is proportional to the square root of the resistance increase so that the indicated current values at 100 megacycles are about 1.6 times the true value of the current.

In accordance with the present invention, heater 11 is not a wire or strip but is a thin walled tubular element which may be formed by bending a thin metal sheet into cylindrical shape. As shown in Fig. 3, the longitudinal edges of the etal sheet are closely adjacent, but need not overlapped or secured to each other, and this int is preferably at the bottom of the assembled iermal converter. The thermocouple junction, preferably a short extension 3' of one thermouple wire beyond the junction, is thermally onnected to the center of the tubular heater. his connection may be made by sliding the tuular heater on a supporting mandrel, and spot elding the extension 3' to the heater.

The heater tube 11 is then mounted on the terinal assembly by placing the tube 11 on the supporting wires 10 and securing it in place by solder 2. The effective length of the heater is deterined by the spacing of the supporting wires but ie assembly is facilitated by forming a relatively ing tube and cutting off or flattening the tube eyond the supports 10. The requirements for btaining thermal compensations determine the ength of the tubular heater and in general this ength may be of the order of 0.20 to 0.25 inch. he skin effect or the rate at which the resistance f the heater 11 increases with frequency depends pon the wall thickness, and I have found that he resistance may be maintained approximately onstant for frequencies up to about 100 megaycles by forming the tubes from 1 mil platinum esistance material. A tube diameter of 28 mils s satisfactory for a 5-ampere instrument, and arger diameter tubes will be used for higher urrent ranges if the same wall thickness is used or a series of instruments of different current anges.

The advantages of the invention will be evilent from a comparison of the performance of ι typical 5-ampere instrument, as described above, with that of the previously known thermoouple ammeters. One instrument with a tubuar heater element gave a reading for 3 amperes it 80 megacycles that was too high by about 5%, while the corresponding readings of instruments of prior designs were too high by as much is from 45 to 70%. The correction factor for the new instrument was 0.94 while the correction actors for the prior instruments ranged from ibout 0.69 to 0.59.

It is obvious that any instrument of stable construction may be calibrated to read accurately at some one frequency but the present invention contemplates instruments that have a high accuracy over an extended range of high and ultrahigh frequencies. Errors of the order of up to 6 and 7% are usually permissible in radio work but greater accuracy may be had by employing a correction factor. The tubular type of heater element is particularly advantageous from this standpoint, as the same correction factor is theoretically appropriate, at any given frequency, for a series of instruments of different current range having heater tubes of 1 mil wall thickness and diameters that increase for higher current ranges.

The usual design requirements for high frequency instruments must be satisfied to secure the high accuracy that is theoretically possible with instruments having thermal converters of the described constructions. Errors which increase with frequency may be introduced when the instruments are operated in radio frequency fields and are not properly shielded, and circuit contours may also introduce errors that increase with frequency.

It is to be understood that the invention is not limited to the particular constructions herein illustrated and described, or to constructions which afford the maximum accuracy at any particular frequency or frequency range as the principles herein stated may be applied in the design of other physical constructions to decrease the errors due to frequency variant resistance of the heater elements of thermocouple ammeters.

I claim:

1. In an ammeter for use at high frequencies, the combination with a millivoltmeter and a thermocouple, of a heater element in heat transfer relationship to said thermocouple, said heater element being tubular and having a wall thickness of the order of not more than 0.004 inch.

2. A thermal ammeter as claimed in claim 1, wherein the tubular heater element has a diameter which imparts to the heater element at maximum current flow therethrough the electrical characteristic of an approximately constant resistance over a range of frequencies extending from one megacycle to an order substantially higher.

3. An ammeter as claimed in claim 1, wherein said heater element has a wall thickness of the order of 0.001 inch.

4. An ammeter as claimed in claim 1, wherein said tubular heater element comprises a thin sheet of metal bent to cylindrical form.

5. A thermal converter for use with a millivoltmeter in the measurement of high frequency currents, said thermal converter comprising a thin walled tubular heater element, and a thermocouple exterior to and having its junction positioned on the longitudinal center of said heater element.

6. A thermal converter as claimed in claim 5, wherein said tubular heater element has a wall thickness of the order of 0.001 inch.

7. A thermal converter as claimed in claim 5, wherein said tubular heater element comprises a thin metal sheet bent to cylindrical form.

8. A thermal converter as claimed in claim 5, wherein said tubular heater element has a length of the order of 0.25 inch.

JOHN H. MILLER.